United States Patent
Ali et al.

(10) Patent No.: US 11,029,980 B2
(45) Date of Patent: Jun. 8, 2021

(54) CUSTOMIZABLE ANIMATIONS

(71) Applicant: salesforce.com, inc., San Francisco, CA (US)

(72) Inventors: Sultan Ali, Bothell, WA (US); Aria Niazi, Rocklin, CA (US); Darrel Dazhi Liu, Issaquah, WA (US); Jeremy Ellison, Kirkland, WA (US); Jianmin Liu, Sammamish, WA (US); Bhargav Venkataraman, San Bruno, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/670,891

(22) Filed: Oct. 31, 2019

(65) Prior Publication Data

US 2021/0132966 A1    May 6, 2021

(51) Int. Cl.
*G06F 9/451*   (2018.01)
*G06T 13/40*   (2011.01)
*G06F 8/34*    (2018.01)

(52) U.S. Cl.
CPC ............... *G06F 9/453* (2018.02); *G06F 8/34* (2013.01); *G06T 13/40* (2013.01)

(58) Field of Classification Search
CPC ... G06F 9/451; G06F 8/61; G06F 3/48; G06F 3/483; G06Q 30/02
See application file for complete search history.

(56) References Cited

U.S. PATENT DOCUMENTS

| | | | |
|---|---|---|---|
| 9,223,589 B2 * | 12/2015 | Young | G06F 9/451 |
| 9,495,079 B2 * | 11/2016 | Rajagopal | G06Q 30/02 |
| 2016/0057240 A1 * | 2/2016 | Straub | H04L 67/42 709/227 |
| 2016/0378439 A1 * | 12/2016 | Straub | G06F 8/61 717/107 |

* cited by examiner

*Primary Examiner* — Cao H Nguyen
(74) *Attorney, Agent, or Firm* — Sterne, Kessler, Goldstein & Fox P.L.L.C.

(57) ABSTRACT

Disclosed herein are system, method, and device embodiments for implementing dynamic customizable animations. A multi-tenant service may configure a visual component of an application to present an animation based on a rule, generate a multi-tenant entity record defining the rule, and generate application code associated with the application. Further, the multi-tenant service may receive a request for animation information associated with the multi-tenant entity record, and send the animation information to the client device. Further, in some embodiments, a client device executing the application may present the animation based on evaluating the animation information.

19 Claims, 6 Drawing Sheets

CUSTOMIZABLE ANIMATIONS

BACKGROUND

A service provider may offer a multi-tenant declarative programming platform that provides resources for declaratively programming applications via functional user interface components. In some instances, developers using the platform to build applications may endeavor to present animations in connection with the user interface components. However, many animation implementations suffer from poor resource and component lifecycle management, fail to account for user preferences, or rely on third-party libraries.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

Figure 1:
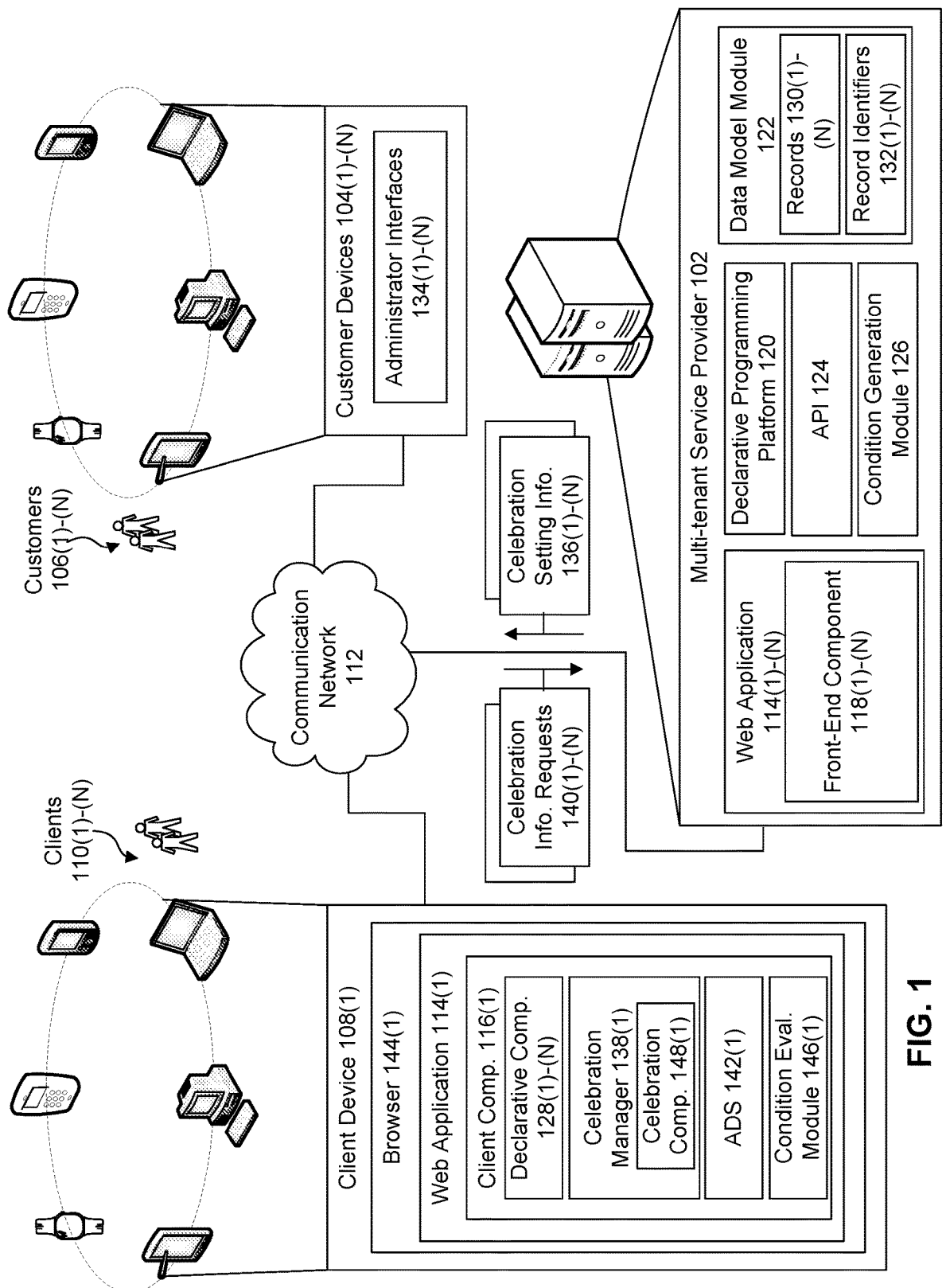
FIG. 1 is a block diagram of an example framework for implementing dynamic customizable animations in a multi-tenant system, according to some embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for implementing customizable animations in a multi-tenant system.

FIG. 1 illustrates a block diagram of an example framework for implementing dynamic customizable animations in a multi-tenant system, according to embodiments of the present disclosure. As illustrated in FIG. 1, a multi-tenant system 100 may include a multi-tenant service 102, a plurality of customer devices 104(1)-(N) associated with a plurality of customers 106(1)-(N), and a plurality of client devices 108(1)-(N) associated with a plurality of clients 110(1)-(N).

In some embodiments, the first customer device 104(1) is associated with the first customer 106(1), the second customer device 104(2) is associated with the second customer 106(2), the Nth customer device 104(N) is associated with the Nth customer 106(N), and so forth. Further, in some embodiments, the first client device 108(1) may be associated with the first client 110(1), the second client device 108(1) may be associated with the second client 110(2), the Nth client device 108(N) may be associated with the Nth client 110(N), and so forth.

Additionally, the multi-tenant service 102, the customer devices 104(1)-(N), and the client devices 108(1)-(N) may communicate via a communication network(s) 112. The communication network(s) 112 may include any or all of a private network, personal area network (PAN), Local-Area Network (LAN), Wide-Area Network (WAN), or the Internet. Further, the connection between the multi-tenant service 102, the customer devices 104(1)-(N), or the client devices 108(1)-(N), and the communication network(s) 112 may be a wireless connection (e.g., Bluetooth, Wi-Fi connection, etc.), or a wired connection (e.g., Ethernet, universal serial bus (USB), etc.), or a combination thereof.

In some embodiments, the multi-tenant service 102 may provide a multi-tenant cloud computing solution to the customers 106(1)-(N). In particular, various elements of hardware and software of the multi-tenant service 102 may be shared by the customers 106(1)-(N). In some embodiments, the data and services provided by the multi-tenant service 102 to individual customers 106 may be securely isolated from the data and services provided to other customers 106. Additionally, or alternatively, in some embodiments, multiple customers 106 may share access to common data and services.

As an example, the customers 106(1)-(N) may provide web applications 114(1)-(N) to the client devices 108(1)-(N) via the multi-tenant service 102. For instance, the first customer 106(1) may design or operate the first web application 114(1) via the multi-tenant service 102, the second customer 106(2) may design or operate the second web application 114(2) via the multi-tenant service 102, and the Nth customer 106(N) may design or operate the Nth web application 114(N) via the multi-tenant service 102. Further, the multi-tenant service 102 may serve the web applications 114(1)-(N) to the client devices 108(1)-(N) via the communication network 112. Additionally, the client devices 108(1)-(N) may send requests associated with the web applications 114(1)-(N) to the multi-tenant service 102 via the communication network 112, and the multi-tenant service 102(N) may process the requests and send responses to the client devices 108(1)-(N) via the communication network 112.

In some embodiments, each web application 114 may include a client component 116 and a front-end component 118. Further, the client component 116 may be executed at least partially on a client device 108, and the front-end component 118 may be at least partially executed by the multi-tenant service 102. In addition, the front-end component 118 may be configured to receive requests from the client component 116, and send responses to the client component 116.

For example, the customer 106(1) may develop and operate the web application 114(1). Further, the web application 114(1) may include the client component 116(1) and the front-end component 118(1). Additionally, one or more clients 110 may use the client component 116(1) on their client devices 108. The client component 116(1) may cause the client devices 108 corresponding to the one or more clients 110 to send data to the front-end component 118(1), and receive data from the front-end component 118(1).

As illustrated in FIG. 1, the multi-tenant service 102 may include a declarative programming platform 120, a data model module 122, an application programming interface (API) 124, the front-end applications 118(1)-(N), and a condition evaluation module 126. In some other embodiments, each individual front-end component 118 may include a corresponding condition evaluation module 126.

The declarative programming platform 120 may be a user interface framework employed by the customers 106(1)-(N) to declaratively program the web applications 114(1)-(N). Further, the declarative programming platform 120 may include declarative components 128(1)-(N) that may be added to the web applications 114(1)-(N). As used herein, in some embodiments, a "declarative component" may refer to a reusable programming unit used to provide a feature or function to an application. In some embodiments, the declarative components 128(1)-(N) may be custom hypertext markup language (HTML) elements built using HTML and JavaScript.

As used herein, and in some embodiments, "declarative programming" may refer to software development via point and click, drag and drop interfaces, configuration wizards, and/or declarative language input (eXtensible Markup Language (XML), YAML Ain't Markup Language (YAML), Extensible Application Markup Language (XAML), or any other markup languages) to text input forms. Further, the customers 106(1)-(N) may employ the declarative programming platform 120 to add dynamic customizable animations to the web applications 114(1)-(N).

As an example, the customer 106(1) may employ a configuration wizard for adding a path component 128(1) to the web application 114(1). Further, the customer 106(1) may configure, via the configuration wizard, the path component 128(1) to present a celebration animation in response to completion of a path stage of the path component 128. As used herein, and in some embodiments, a "path component" may refer to a declarative component for displaying the progress of a process. In some embodiments, the path component may be built from a picklist field, as described with respect to FIG. 5 herein. Further, the path component 128(1) may be rendered within the web application 114(1) as a horizontal bar with a chevron for each picklist item. Additionally, a graphical effect may be applied to each chevron based on user activity. As used herein, and in some embodiments, a "path stage" may refer to a step within a process represented by a path component. In some embodiments, a path stage may correspond to a picklist item in the picklist field that has been selected to build the path component.

Additionally, or alternatively, the declarative programming platform 120 may include a configuration wizard for adding an animation to other types of declarative components. For instance, the declarative programming platform 120 may include an animation configuration wizard for adding customizable animations to the web application 114(1), or a configuration wizard for a declarative component 128 may be configured to add an animation associated with the declarative component 128 to the web application 114(1).

The multi-tenant service 102 may be configured to serve the web applications 114(1)-(N) to the client devices 108(1)-(N). The data model module 122 may be configured to store information associated with the multi-tenant system 100. For example, the data model module 122 may store application code, configuration information, and related data (e.g., media files) associated with the web applications 114(1)-(N). As an example, the customer 106(1) may design and develop the web application 114(1) using the declarative components 128 of the declarative programming platform 120. Further, the declarative programming platform 120 may generate application code (e.g., configuration code) or configuration information corresponding to the web application 114(1) during the development process, and store the application code or configuration information in the data model module 122. In some embodiments, the application code or configuration information may include XML code, HTML code, or JavaScript code corresponding to the declarative components 128(1)-(N).

For instance, the declarative programming platform 120 may generate application code representing presentation of a celebration animation upon completion of a path stage of a path component of the website application 114(1). In addition, the declarative programming platform 120 may store the application code in the data model module 122.

Further, the data model module 122 may store customer information associated with the customers 106(1)-(N) or the customer devices 104(1)-(N), and client information associated with the clients 110(1)-(N) or the client devices 108(1)-(N). Some examples of customer information and client information include security information, security permissions, usage information, configuration preferences, financial information, location information, customer management information, etc.

In some embodiments, the data model module 122 may be a multi-tenant database. As used herein, the term "multi-tenant database" refers to those database systems in which various elements of hardware and software of the database system may be shared by a plurality of entities, e.g., one or more customers 106. As used herein, the term "database" refers to an organized collection of data. Some examples of databases include columnar databases, relational databases, key-store databases, graph databases, and document stores.

As illustrated in FIG. 1, the data model module 122 may be an organized collection of records 130(1)-(N). Further, in some embodiments, each record 130 may have a corresponding record identifier 132. For example, the record identifier 132(1) may identify the record 130(1), the record identifier 132(2) may identify the record 130(2), the record identifier 132(N) may identify the record 130(N), and so forth. Further, an individual record identifier 132 may uniquely identify its corresponding record 130 within the multi-tenant system 100.

As used herein, and in some embodiments, a "record" may refer to a data entity, such as an instance of a data object created by a customer 106 of the multi-tenant service 102. In some embodiments, a data object may be a standard object having a data structure defined by the multi-tenant service 102, or a custom data object having a data structure defined by a customer 106. Further, the data structure of a data object may define data fields of the record. Each data field may have a data type indicating the type of information the data field stores.

In some embodiments, a data object may correspond to a database table of a database system, a data field of the database object may correspond to a column of the database table, and a record may correspond to a row of the database table. Some example data types include alphanumeric string, integer, decimal, floating point, date, time, binary value, boolean, identifier, relationship, checkbox, formula, address, currency, enumerated combination box, email address, encrypted string, location, percent, phone number, reference, text area, uniform resource locator, enumeration, etc.

The API 124 may be configured to manage the data model module 122. For instance, the API 124 may be configured to create, retrieve, update or delete the records 130(1)-(N). In some embodiments, the API may include a Simple Object Access Protocol (SOAP) API, a REpresentational State Transfer (REST) API, or any other type of protocol that may be employed for sending requests to the data model module 122.

Further, the declarative programming platform 120, the web applications 114, and the front-end components 118(1)-(N) may manage the data of the data model module 122 via the API 124. For instance, when configuring the web application 114(1) to present a celebration animation upon completion of a path step of a path component 128(1), the declarative programming platform 120 may use the API 122 to create records 130(1)-(2) storing information corresponding to the path component 128(1), the path stage, or the celebration animation. As an example, the declarative programming platform 120 may use the API 122 to create the record 130(1) in the data model module 122 corresponding to the path stage. The record 130(1) may include its record identifier 132(1), a title of the path stage, an identifier of the path stage, an identifier of the path component 128 containing the path stage, an identifier of the web application 114(1) containing the path stage, and a status (e.g., complete, incomplete, etc.) of the path stage. Further, the declarative programming platform 120 may use the API 122 to create the record 130(2) in the data model module 122 corresponding to the celebration animation performed upon completion of the path stage of the path component 128(1). The record 130(2) may include its record identifier 132(2), a record identifier of the path stage (i.e., the record identifier of the record 130(1)), an identifier of the celebration animation, a condition for presenting the celebration animation, and animation frequency information. In some embodiments, the information of records 130(1) and 130(2) may be stored in a single record.

In some embodiments, the front-end applications 118(1)-(N) may be configured to receive requests from the client components 116(1)-(N), and provide responses to the client components 116(1)-(N). Further, the customers 106(1)-(N) may develop and manage the front-end components 118(1)-(N) and the client components 116(1)-(N) via the administrator interfaces 134(1)-(N) of the customer devices 104(1)-(N). The administrator interfaces 134(1)-(N) may be web applications that provide access to the declarative programming platform 120. For instance, the administrator interfaces 134(1)-(N) may present point and click, drag and drop interfaces, configuration wizards, and/or declarative language input for developing the web applications 114(1)-(N) associated with the declarative programming platform 120.

As an example, the administrator interface 134(1) may present a configuration wizard for adding a path component to the web application 114(1). The customer 106(1) may provide user input to the configuration wizard instructing the declarative programming platform 120 to add the path component 128(1) to the web application 114(1). Further, the customer 106(1) may provide user input to the configuration wizard requesting that the declarative programming platform 120 configure the web application 114(1) to display a celebration animation upon completion of a path stage of the path component 128(1). In some embodiments, the customer 106(1) may select the type of animation to present upon completion of the path stage, a condition for presenting the animation, and a frequency option indicating how often the animation should be presented when the condition is true (e.g., the path stage is completed).

In response, the declarative programming platform 120 may store animation setting information 136 corresponding to the celebration animation within the records 130(1)-(N) of the data model module 122. Further, the declarative programming platform 120 may generate application code or configuration information within the front-end component 118(1) and the client component 116 associated with the path component 128(1). For example, the declarative programming platform 120 may add an animation manager 138(1) to the client component 116(1), and configure the client component 116(1) to present the path component 128(1) within a graphical user interface of the client component 116(1).

In some embodiments, the path component 128(1) presented within the client component 116 may be configured using data stored within the records 130(1)-(N). As such, the path component 128(1) may be configured to request data stored within the data model module 122. For example, the declarative programming platform 120 may configure the path component 128(1) to send the animation information request 140(1) to the front-end component 118 in order to obtain the animation setting information 136(1), evaluate the animation setting information 136(1), and trigger the celebration animation based on the evaluation. Additionally, the declarative programming platform 120 may configure the front-end component 118(1) to provide the animation setting information 136(1) to the client component 116(1) via the API 124.

In some embodiments, each client component 116 may be configured to include an application data service 142 for locally managing the records 130 associated with the client component 116. For instance, the application data service 142(1) may be used by the path component 128(1) to load, create, edit, or delete the records (e.g., 130(1)-(2)) associated with the client component 116(1). In some examples, the path component 128(1) may request the records 130(1)-(2) from the application data service 142(1) during execution of the web application 114(1).

In addition, the customer 106(1) may employ the administrator interface 134(1) to update the configuration or settings of the web application 114(1) in a post-development phase. In some instances, the administrator interface 134(1) may be used to create, modify, and delete the path component 128(1) of the web application 114(1). For example, the administrator interface 134(1) may be used to update the path stages of the path component 128(1) of the web application 114(1). As another example, the customer 106(1) may employ the administrator interface 134(1) to update a title of the path stage or the type of animation presented with respect to the path stage. In both examples, the administrator interface 134(1) may send a request to the declarative programming platform 120, which may then update the records 130(1) or 130(2) using the API 124.

As illustrated in FIG. 1, the client devices 108(1)-(N) may include web browsers 144(1)-(N). A "web browser," as referred to herein, may relate to a software application or a software application component for retrieving, rendering, and presenting information resources from the World Wide Web and/or other sources. Web browsers enable users to access and view documents and other resources located on remote servers, e.g., the multi-tenant service 102.

For example, the web browser 144(1) may retrieve portions of the web application 114(1) (e.g., the client component 116(1)) and any associated media and/or files) from the multi-tenant service 102 using a HTTP connection via the communication network 112, render the client component 116(1), and present the rendered client component 116(1) to the client 110(1) via the client device 108(1). Some examples of web browser applications include Google Chrome™, Mozilla Firefox™, Microsoft Internet Explorer™, Opera™, and Apple Safari™.

As illustrated in FIG. 1, the client components 116(1)-(N) may include animation managers 138(1)-(N) and condition evaluation modules 146(1)-(N). For example, the client component 116(1) may include the animation manager 138(1) and the condition evaluation module 146(1), the client component 116(2) may include the animation manager 138(2) and the condition evaluation module 146(2), the client component 116(N) may include the animation manager 138(N) and the condition evaluation module 146(N), and so forth. The animation managers 138(1)-(N) may be configured to dynamically manage presentation of customizable animations within the client components 116(1)-(N). In addition, the condition evaluation modules 146(1)-(N) may determine whether the animations should be displayed based on the conditions generated by the condition generation modules 126(1)-(N)

For instance, the client 110(1) may complete the path stage of the path component 128(1) of the client component 116(1), and select a GUI button displayed within the client component 116(1) that causes user input to the path stage to be saved to the data model module 122. In response, the path component 128(1) may send, to the multi-tenant service 102, an animation information request 140(1) including a record identifier 132(2) of a record 130(2) associated with the celebration animation via the communication network 112. Additionally, or alternatively, the animation information request 140(1) may include any other identifier capable of identifying the animation information corresponding to completion of the path stage, the path stage, or the path component 128(1). Further, the path component 128(1) may receive the animation setting information 136(1) from the front-end component 118(1) in response to the animation information request 140(1).

In some instances, the front-end component 118(1) may obtain the animation setting information 136(1) from the data model module 122 via the API 124, and send the animation setting information 136(1) to the path component 128(1) via the communication network 112. In some embodiments, the animation setting information 136(1) may include the records 130(1)-(2) associated with the celebration animation. In some other embodiments, the animation setting information 136(1) may include data from the records 130(1)-(2) associated with the celebration animation. For example, the animation setting information 136(1) may include at least the type of the celebration animation, the condition for presenting the celebration animation as generated by the condition generation module 126(1), and animation frequency information.

Upon receipt of the animation setting information 136(1), the path component 128(1) may employ the condition evaluation module 146(1) to determine whether to display the celebration animation based on the condition. For example, the condition may indicate that the celebration animation may be presented when a client 110(1) provides particular information to a path stage of the path component 128(1). As such, the condition evaluation module 146(1) may determine whether the client 110(1) has provided the particular information to the path stage. In some embodiments, the path component 128(1) may request the animation setting information 136(1) from the application data service 142(1) and provide the requested information to the condition evaluation module 146(1).

In addition, the path component 128(1) may determine whether to present the celebration animation based on animation frequency information. For example, the path component 128(1) may determine that the celebration animation should be presented based on the animation frequency information indicating that the animation should be presented whenever the condition is met. As another example, the path component 128(1) may determine whether the celebration animation should be presented based on the animation frequency information indicating that celebration animation should be presented rarely, occasionally, or often. For instance, the path component 128(1) may identify a probability value associated with the animation frequency information, and determine whether to present the celebration animation based on the probability value.

When the path component 128(1) determines that the celebration animation should be displayed, the path component 128(1) may fire an event requesting dynamic rendering of the animation component 148(1) within the client component 116(1). In some embodiments, the event may include an animation identifier identifying the type of animation to display. For example, the event may include an animation identifier indicating that the animation component 148(1) should be configured to display a balloon animation.

Further, the event may propagate up a container hierarchy until it is received by a container configured to handle the event. Upon receipt by the appropriate container, container may provide the event to the animation manager 138(1). As described herein, the animation manager 138(1) may be configured to dynamically render an animation component 148(1) corresponding to the celebration animation identified by the animation identifier included in the event, and call a method on the animation component 148(1) that causes the celebration animation to be displayed by the client component 116(1).

In some embodiments, the animation manager 138(1) may identify the type of animation based on an animation identifier included in the event, and determine the configuration information corresponding to the type of animation from the configuration code of the client component 116(1). In some embodiments, the client component 116(1) may include a map value comprising key-value pairs, wherein the types of animation are the keys of the key-value pairs, and the configuration information of the animations are the values of the key-value pairs. As an example, the animation manager 138(1) may determine that a balloon animation is specified by the event, and identify the configuration information needed to create an animation component for displaying the balloon animation within the map value. Further, in some instances, the declarative programming platform 120 may update the configuration code corresponding to the various animations by updating the web applications 114 via the communication network 112.

Once the animation manager 138(1) has identified the configuration information of the celebration animation, the animation manager 138(1) may dynamically create the animation component 148(1) based on the configuration information. In particular, the animation component 148(1) may be configured to display the animation based on the configuration information. In some embodiments, the animation component 148(1) may be built using HTML, CSS, and JavaScript. For example, the animation component 148(1) may utilize CSS Animations and an animation loop based on the requestAnimationFrame method. Further, in some instances, building the animation component 148(1) may not require use of a third-party library.

In some embodiments, the animation may be a standard animation, and the configuration information for the animation may be provided by the declarative programming platform 120. Further, the animation may be a custom animation, and the configuration information for the animation may include modifications made by the customers 106(1)-(N). Additionally, or alternatively, the customers 106(1)-(N) may add customer-supplied animations to the web applications 114(1)-(N) by adding configuration information for the customer-supplied animations to the client components 116(1)-(N).

In some embodiments, the animation managers 138(1)-(N) may manage the lifecycle of the animation components 148(1)-(N). For example, the animation manager 138(1) may be configured to generate the animation component 148(1), insert the animation component 148(1) into the document object model (DOM), render the animation component 148(1), fire an event of the animation component 148(1), and remove the animation component 148(1) from the DOM or reuse the animation component 148(1) to display another animation. The animation manager 138(1)-(N) provide the web applications 114(1)-(N) with a resource efficient means for implementing an animation responsive to user action over the records 130(1)-(N) of the multi-tenant system 100. Further, the declarative programming platform 120 may optimize the speed, and size of the animation managers 138(1)-(N) and animations via updates to the web applications 114 or the declarative components 128 used to build the web applications 114.

Figure 2:
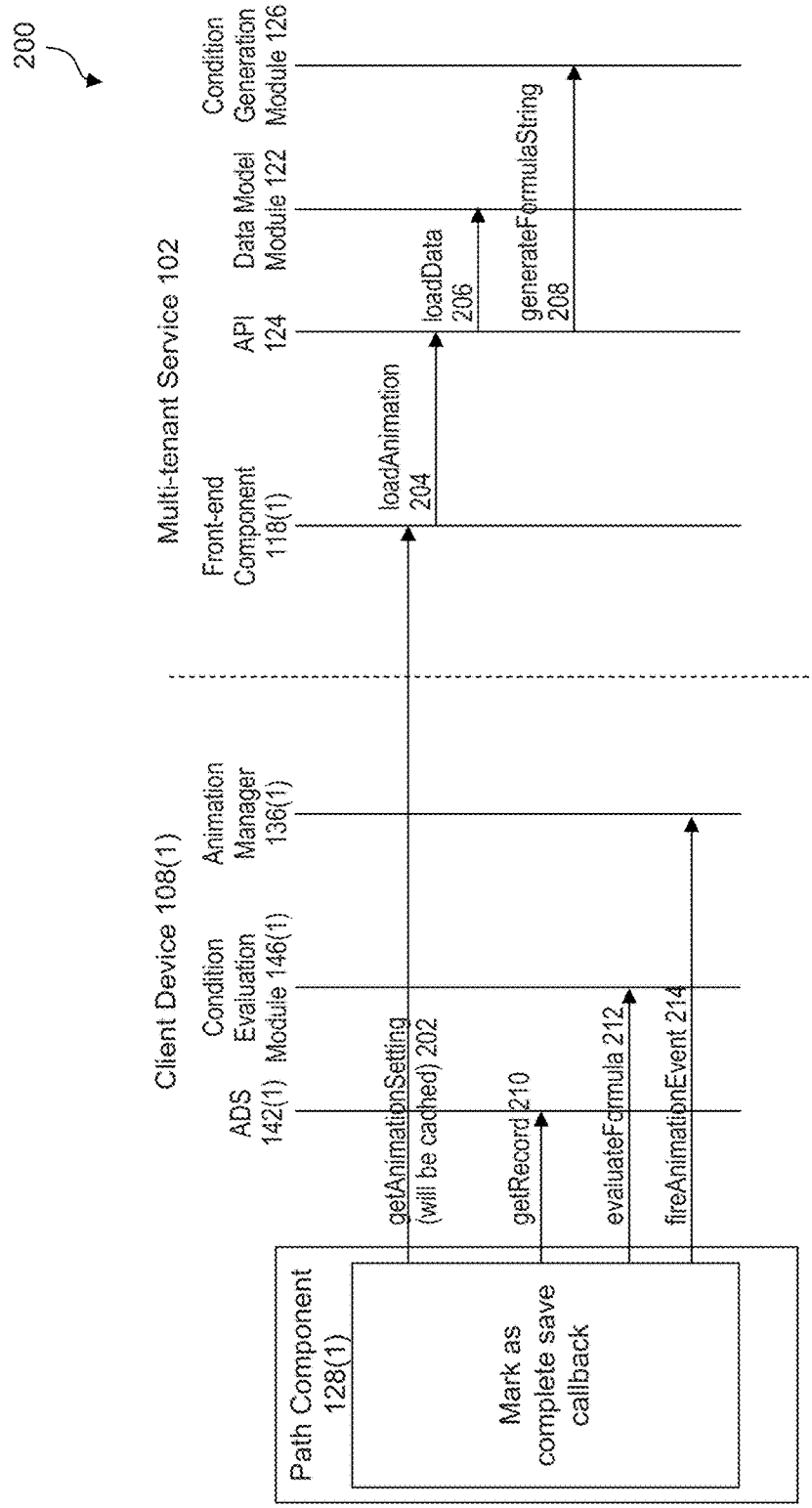
FIG. 2 is a sequence diagram for implementing customizable animations in a multi-tenant system, according to some embodiments.

FIG. 2 illustrates a sequence diagram for implementing dynamic customizable animations in a multi-tenant system, according to embodiments of the present disclosure. The animation may display, for example, a plurality of balloons within a graphical user interface for the purposes of indicating that a user has successfully completed an activity of a web application (e.g., the web application 114(1)). Additionally, or alternatively, the animation may display confetti within a graphical user interface in response to a user performing an activity of a web application.

As shown in FIG. 2, at step 202, the path component 128(1) of the client component 116(1) may request the animation setting information 136(1) from the front-end component 118(1) by sending the animation information request 140(1) to the multi-tenant service 102.

At step 204, the front-end component 118(1) may receive the animation information request 140(1), and retrieve the animation setting information 136(1) from the data model module 122 via the API 124. As illustrated in FIG. 2, in some embodiments, the front-end component 116(1) may call a load animation method of the API 124 to retrieve the animation setting information 136(1).

At step 206, in response to load animation method call, the API 124 may call a load record method of the data model module 122. The load data method may retrieve one or more records 130 of the data model module 122 associated with an animation corresponding to an action performed with respect to the path component 128(1).

In some embodiments, the API 124 may use identifier information included in the animation information request 140(1) to retrieve the records 130 associated with the path component 128(1). For example, the animation information request 140(1) may include at least one of a record identifier 132(1) associated with the path component 128(1), a record identifier 132(2) associated with the animation, or any identifier that may be used to identify the animation associated with the path component 128(1). As described in detail above, the retrieved records 130(1)-(2) may include condition information indicating when the celebration animation should be performed. Some examples of condition information include a rule that determines whether user input has caused the creation, removal, update or deletion of a record 130 within the data model module 122, a rule detecting an update to a data field of a record 130, a rule detecting input of a particular data value to a data field of a record 130, a rule detecting of a data value that is lesser than or greater than a predetermined value to a data field of a record 130, or any other detectable input to the web application 114(1).

At step 208, the API 124 may request that the condition generation module 126 generate a formula string (i.e. a condition) that encodes a rule for determining whether to present an animation based on the retrieved records 130(1)-(2). Further, the client component 116(1) may be configured to use the formula string to determine whether to display the animation. For instance, the condition generation module 126 may generate a JavaScript snippet that may be employed to determine whether to present an animation with respect to the path component 128(1). Further, the multi-tenant service 102 may send the animation setting information 136(1) to the client component 116(1). Further, as described in detail herein, the animation setting information 136(1) may include formula string and the animation frequency information.

At step 210, the path component 128(1) may obtain the animation setting information 136(1) retrieved from the multi-tenant service 102. In some embodiments, the path component 128(1) may load one or more records 130 included in the animation setting information 136(1) from a cache associated with the client component 116(1) or the web browser 144(1).

Further, at step 212, the path component 128(1) may determine whether to display the animation. As illustrated in FIG. 2, in some embodiments, the path component 128(1) may determine whether to display the animation based on the formula string of the animation setting information 136(1). For example, a condition evaluation module may evaluate the JavaScript snippet included in the animation setting information 136(1). In some instances, the JavaScript snippet may evaluate to a Boolean value (e.g., true or value) indicating whether to display the animation. In some embodiments, the path component 128(1) may further determine whether to display the animation based on the animation frequency information of the animation setting information 136(1).

At step 214, the path component 128(1) may cause display of the animation via the animation manager 138(1) based on evaluation of the condition information or the animation frequency information. For example, the path component 128(1) may cause the animation manager 138(1) to dynamically generate an animation component 148(1) corresponding to a type of animation identified in the animation setting information 136(1), and fire a method of the animation component 148(1) that displays the animation. Further, the path component 128(1) may call the method of the animation manager 138(1) based on the condition information evaluating to true and the animation frequency information indicating that the animation should be displayed.

Figure 3:
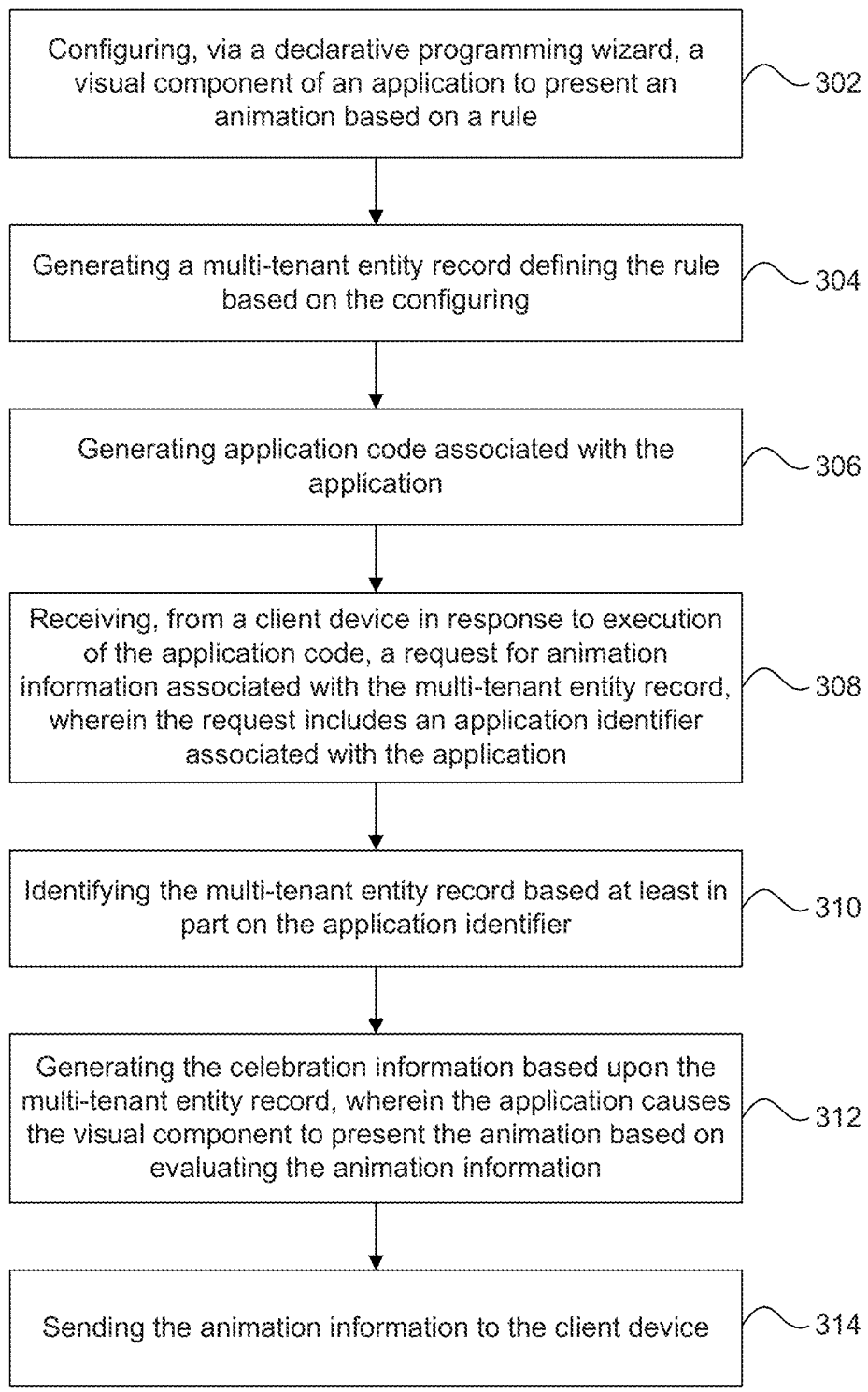
FIG. 3 illustrates an example method for implementing dynamic customizable animations in a multi-tenant system, according to some embodiments.

FIG. 3 illustrates a method 300 for implementing dynamic customizable animations in a multi-tenant system, according to some embodiments, according to some embodiments. Method 300 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

At 302, a multi-tenant service may configure, via a declarative programming wizard, a visual component of an application to present an animation based on a rule. For example, the declarative programming platform 120 may receive instruction from a configuration wizard of the administrator interface 134(1) to add the path component 128(1) to the web application 114(1), and display a first type of celebration animation within the web application 114(1) in response to completion of a path stage of the path component 128(1). Some examples of rules include the condition that user input caused the creation, removal, update or deletion of a record 130 within the data model module 122, the condition that a particular data field of a record 130 has been updated, the condition that a particular data value has been input for a data field of a record 130, the condition that a data value of greater or lesser value than a predetermined value has been input for a data field of a record 130, or any other detectable input to the web application 114(1).

At 304, the multi-tenant service may generate a multi-tenant entity record defining the rule based on the configuring. For example, the declarative programming platform 120 may generate records 130(1)-(2) corresponding to the path component and the celebration animation. In some embodiments, the declarative programming platform 120 may generate the records 130(1)-(2) within the data model module 122 via the API 124. The records 130(1)-(2) may include animation information identifying a condition for presenting a celebration animation, the type of the celebration animation to perform, and animation frequency information indicating how often to present the celebration animation when the condition is true.

At 306, the multi-tenant service may generate application code associated with the application. For example, the declarative programming platform 120 may generate application code corresponding to the path component 128(1). Further, the path component 128(1) may be configured to display the celebration animation based on a rule within the application code.

In some embodiments, the generated application code includes the client component 116(1) with the animation manager 138(1) configured to dynamically create animation components corresponding to a plurality of animations based on the animation setting information 136(1). Further, the generated application code may include a front-end component 118(1) configured to retrieve the animation setting information 136(1) from the data model module 122 and send it to the client component 116(1).

At 308, the multi-tenant service may receive, from a client device in response to execution of the application code, a request for animation information associated with the multi-tenant entity record, wherein the request includes an application identifier associated with the application. For example, the front-end component 118(1) may receive the animation information request 140(1) from the client component 116(1). In some embodiments, the animation information request 140(1) may include the record identifiers 132(1)-(2). Further, the record identifier 132(1) may identify the record 130(1) storing data corresponding to the path component 128(1), and the record identifier 132(1) may identify the record 130(2) storing data corresponding to the celebration animation.

At 310, the multi-tenant service may identify the multi-tenant entity record based at least in part on the application identifier. For example, the front-end component 118(1) may retrieve the records 130(1)-(2) using the API 124 based on the record identifiers 132(1)-(2).

At 312, the multi-tenant service may generate the animation information based upon the multi-tenant entity record, wherein the application causes the visual component to present the animation based on evaluating the animation information. For example, the front-end component 118(1) may be configured to generate the animation setting information 136(1) based upon the retrieved record 130(2). Further, the animation setting information 136(1) may include conditional information indicating when to display a celebration animation, animation frequency information indicating how often to present the animation when the conditional information evaluates to true, or an animation identifier identifying a type of animation to perform.

At 314, the multi-tenant service may send the animation information to the client device. For example, the front-end component 118(1) may send the animation setting information 136(1) to the client component 116(1). Upon receipt of the animation setting information 136(1), the client component 116(1) may present the celebration animation using the animation manager 138(1).

Figure 4:
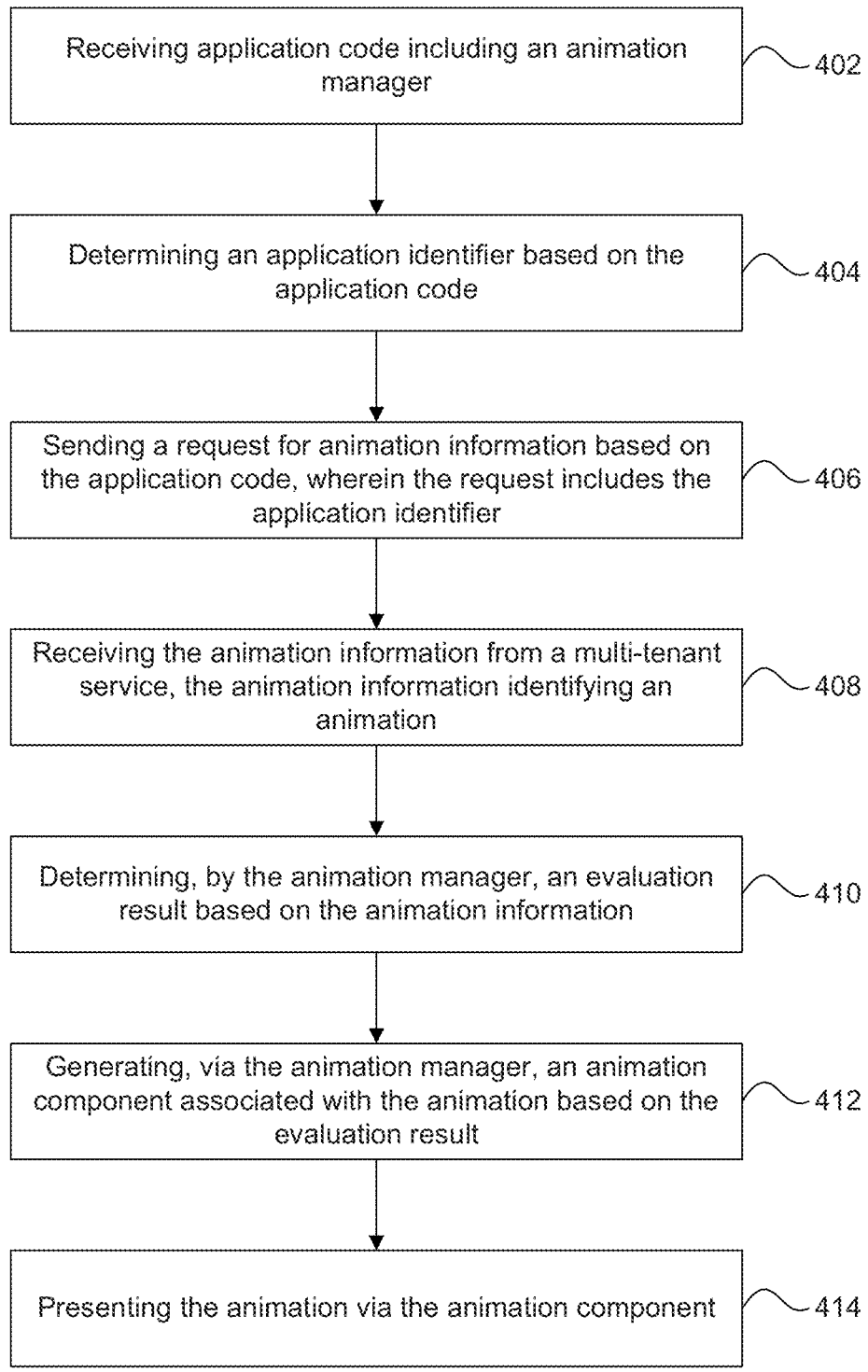
FIG. 4 illustrates an example method for implementing dynamic customizable animations in a multi-tenant system, according to some embodiments.

FIG. 4 illustrates a method 400 for implementing dynamic customizable animations in a multi-tenant system, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

At 402, the client device receives application code including an animation manager. For example, the client device 108(1) may receive the client component 116(1) from the multi-tenant service 102 via the communication network 112. As described in detail above, the client component 116(1) may be associated with the web application 114(1) operated by the customer 106(1) of the multi-tenant service 102. Further, the client component 116(1) may include the path component 128(1) and the animation manager 138(1).

At 404, the client device determines an application identifier based on the application code. For example, the path component 128(1) and animation manager 138(1) may be configured to display a celebration animation in response to user input associated with the path component 128(1), e.g., receipt of user input at a path stage of the path component 128(1). In response to the user input, the client component 116(1) may identify one or more identifiers associated with the celebration animation and the path component 116(1). In some embodiments, the identifiers may be the record identifier 132(1) identifying the record 130(1) storing data corresponding to the path component 128(1) or the record identifier 132(2) identifying the record 130(2) storing data corresponding to the celebration animation.

At 406, the client device sends a request for animation information based on the application code, wherein the request includes the application identifier. For example, the client component 116(1) may send the animation information request 140(1) to the front-end component 118(1) of the multi-tenant service 102. Further, the animation information request 140(1) may include the record identifiers 132(1)-(2) identifying the record 130(1)-(2) associated with the path component 128(1) and the celebration animation, respectively.

At 408, the client device receives the animation information from a multi-tenant service, the animation information identifying an animation. For example, the client component 116(1) may receive the animation setting information 136(2) from the front-end component 118(1). In some embodiments, the animation setting information 136(1) may include the record 130(2) associated with the celebration animation. In some other embodiments, the animation setting information 136(1) may include data from the record 130(2) associated with the celebration animation. For example, the animation setting information 136(1) may include at least the type of the celebration animation, the condition for presenting the celebration animation, and the animation frequency information.

At 410, the client device determines an evaluation result based on the animation information. For instance, the path component 128 may provide the condition information to the condition evaluation module 146(1), which determines that a condition set forth within the condition information matches a state of the web application 114(1). As an example, the condition evaluation module 146(1) may determine that a condition of the condition information evaluates to true in view of the receipt of user input at a path stage of the path component 128(1).

Additionally, the path component 128(1) may determine whether to display the celebration animation based on the animation frequency information of the animation setting information 136(1). For instance, if the animation frequency information indicates that the celebration animation should be presented in every instance in which the condition evaluates to true, the animation manager 138(1) may determine that the celebration animation should be displayed whenever the evaluation result is equal to true. In some other instances, if the animation frequency information indicates that celebration animation should be presented rarely, occasionally, or often, the animation manager 138(1) may determine that the celebration animation should not be displayed even when the evaluation result is equal to true. In some embodiments, as described herein, the animation manager 138(1) may determine that celebration animation should be displayed when the evaluation result is true and performing a probability determination based on the animation frequency information.

In some embodiments, the path component 128(1) may determine that celebration animation should not be displayed based on browser settings associated with the web browser 144(1). For instance, the browser settings may include accessibility features, adaptive strategies, content settings, or optimization settings indicating that client 110(1) would prefer that certain types of content not be presented within the web browser 144(1). Instead, in some embodiments, the path component 128(1) may generate the animation component 148(1) based on a default animation or alternative animation based on the browser settings. In some instances, the alternative animation may be in accordance with one or more preferences identified in the browser settings.

At 412, the client device generates, via the animation manager, a celebration component associated with the animation based on the evaluation result. For example, the animation manager 138(1) may dynamically generate the animation component 148(1) associated with a type of animation identified in the animation setting information 136(1). The animation may be a standard animation type added by the declarative programming platform 120, a custom animation type based on customer edits to a standard animation type, or a customer supplied animation type added by the customer 106(1) to the client component 116(1).

Further, the animation manager 138(1) may generate the animation component 148(1) based at least in part on the evaluation result indicating that the client 110(1) successfully completed the path stage of the path component 128(1). In some embodiments, the animation manager 138(1) may further determine whether to generate the animation component 148(1) based on animation frequency information. For instance, as described herein, animation manager 138(1) may determine not to generate the animation component 148(1) based on a probabilistic calculation associated with the animation frequency information.

In some embodiments, the animation component 148(1) may have been previously generated. As such, the animation manager 138(1) may identify the previously generated animation component 148(1), and re-purpose the previously generated animation component 148(1) to display the animation.

At 414, the client device presents the animation via the celebration component. For example, the animation manager 138(1) may cause the animation component 148(1) to display the celebration animation. In some instances, the animation component 148(1) may employ a requestAnimationFrame call to present the animation. Further, the animation may include presenting confetti or balloons in a graphical user interface of the client component 116(1).

In some embodiments, the animation manager 138(1) may modify the celebration animation displayed by the animation component 148(1) based on the browser settings associated with the web browser 144(1). For instance, the browser settings may modify an animation speed associated with the celebration animation, one or more colors of objects within the celebration animation, or one or more fonts applied within the celebration animation. In some other instances, the animation manager 138(1) may disable the animation based on the browser settings.

Figure 5:
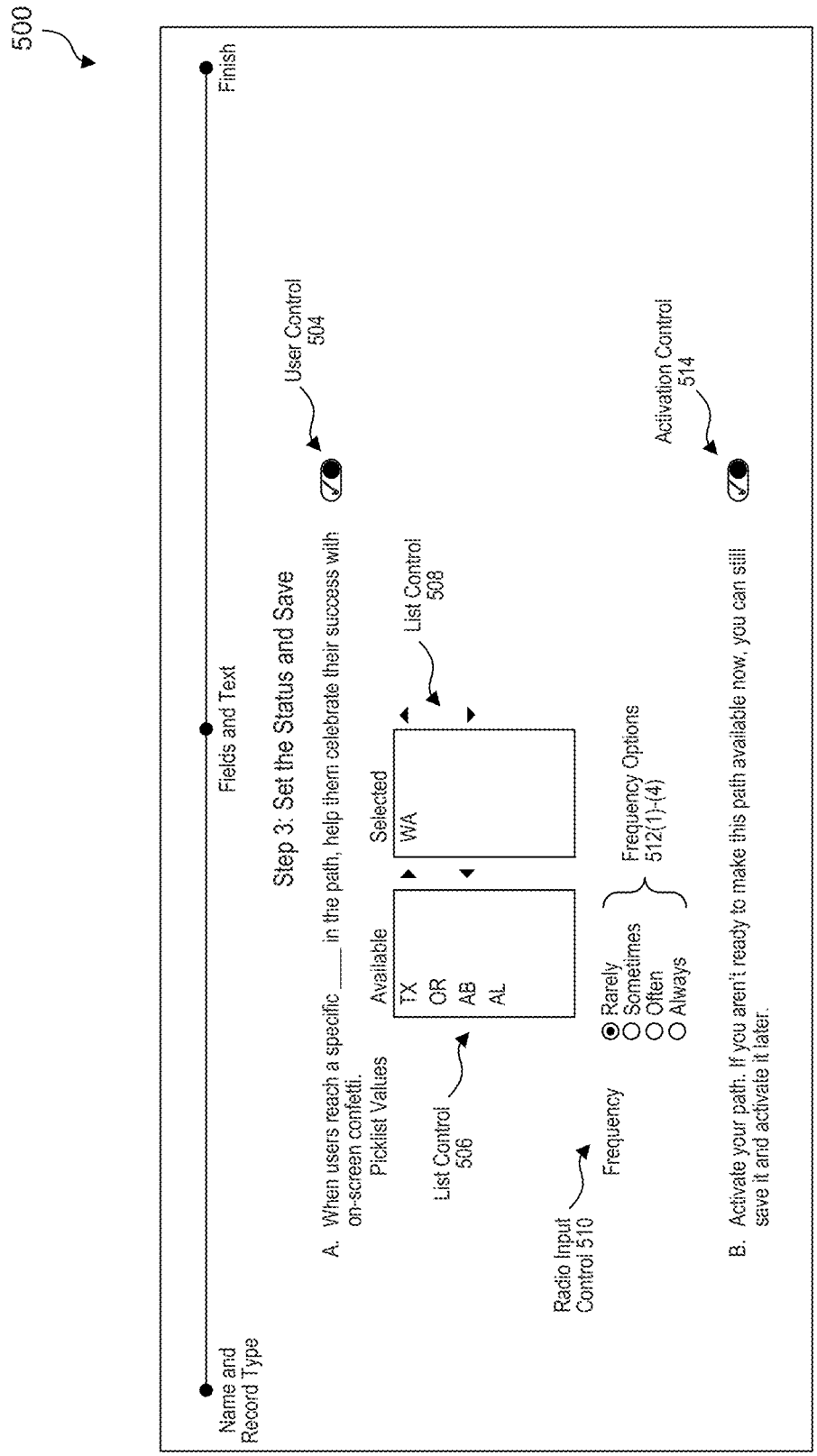
FIG. 5 illustrates an example graphical user interface (GUI) of an administrator tool for implementing dynamic customizable animations in a multi-tenant system, according to some embodiments.

FIG. 5 illustrates an example GUI 500 of an administrative interface for declaratively programming an application to implement a dynamic animation on a declarative programming platform, according to embodiments of the present disclosure.

As illustrated in FIG. 5, the GUI 500 may include a path configuration wizard 502 for configuring a path component of a web application. Further, the path configuration wizard 502 may include a user control 504 for enabling an animation in response to user events associated with a path component being configured.

Additionally, the path configuration wizard 502 may include a list control 506 that lists the path steps of the path component, and a list control 508 that lists paths steps of the path component that will have an animation presented in response to user input. In some embodiments, the declarative programming platform may determine the condition information associated with an animation based at least in part on the path steps included in the list control 508. For example, the declarative programming platform may generate condition information indicating that the animation should be displayed when the path steps of the path component successfully receive user input from a client.

Referring to FIG. 5, the path configuration wizard 502 may further include a radio input control 510 that may be used to set animation frequency information of the animation corresponding to the path component. As illustrated in FIG. 2, the radio input control 510 may include a plurality of different frequency options 512(1)-(4).

In addition, the path configuration wizard 502 may further an activation control 514. When the activation control 514 is enabled, the declarative programming platform may generate one or more records associated with the path component, path steps of the path component, or the animation. For instance, the declarative programming platform may create a record for the animation via the API 124, and the record may include condition information based on the list control 508 and animation frequency information based on the radio input control 510.

In some embodiments, the path configuration wizard may include one or more features for selecting a type of animation to display. Additionally, or alternatively, the path configuration wizard 502 may include one or more features for declaratively modifying an animation. For example, the path configuration wizard 502 may be configured to permit a client to modify an animation speed associated with the animation, one or more colors of objects within the animation, or one or more fonts applied within the animation, a shape of one or more objects of the animation, an animation pattern of one or more objects of the animation, etc.

Although some embodiments herein implement dynamic customizable animations (e.g., a celebration animation) in a multi-tenant system, a person having ordinary skill in the art would understand that the path configuration wizard (and the multi-tenant system 100) may be used to add other forms of dynamic graphical objects or effects to web applications (e.g., the web applications 114(1)-(N)). For instance, the multi-tenant system 100 may be used to add graphical objects or graphical effects implemented using HTML, JavaScript, CSS, or any equivalent development language to the web applications 114(1)-(N).

Figure 6:
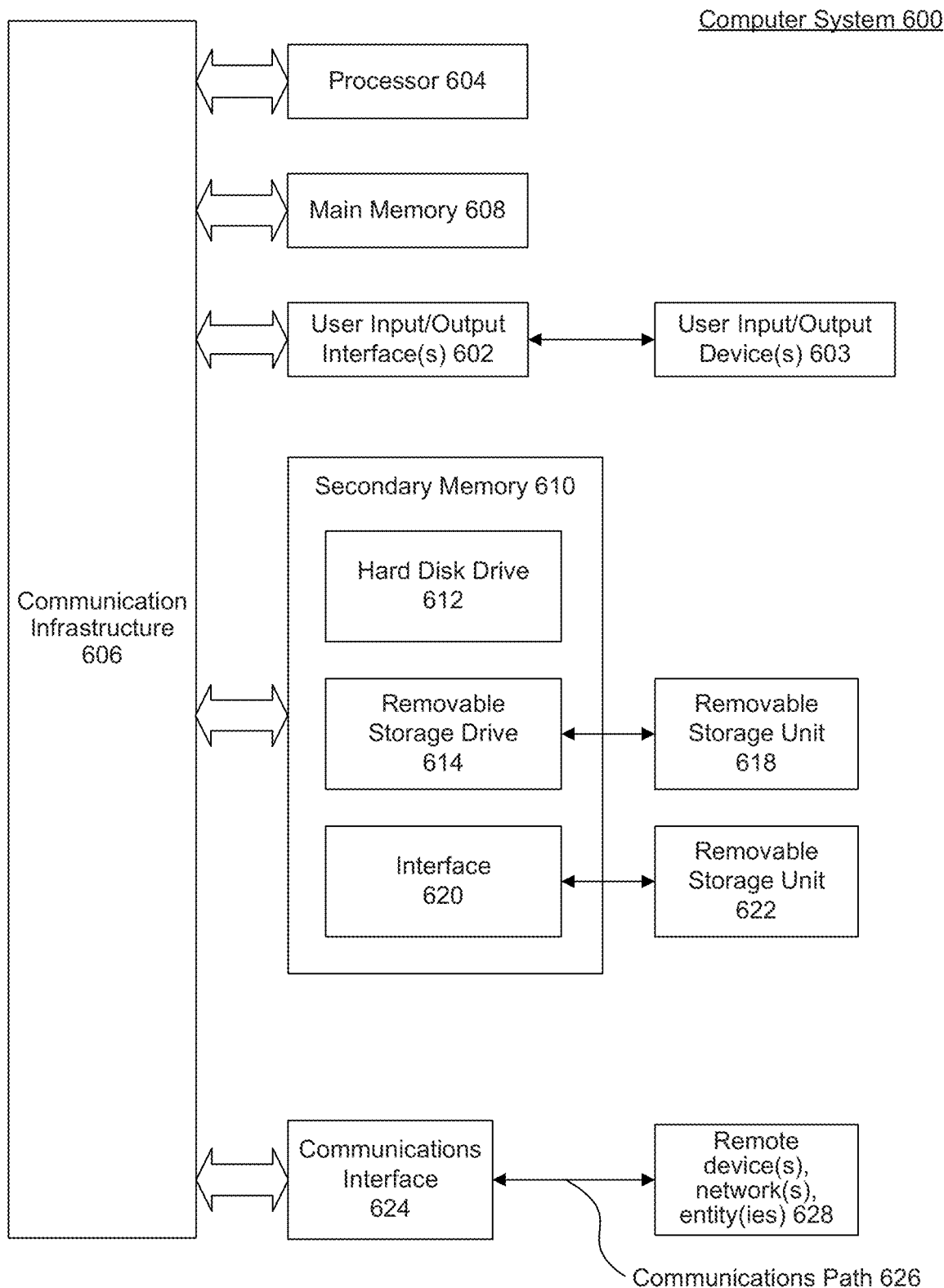
FIG. 6 illustrates a computer system, according to exemplary embodiments of the present disclosure.

FIG. 6 is an example computer system useful for implementing various embodiments. Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 602, such as monitors, keyboards, pointing devices, etc., which may communicate with communication infrastructure or bus 606 through user input/output device(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   receiving, via a declarative programming wizard, a request to configure a visual component of an application to present an animation based on a condition and a frequency option indicating how often the animation is to be presented when the condition is true;
   generating a record comprising the condition and the frequency option;
   generating application code associated with the application;
   receiving, from a client device in response to execution of the application code, a request for animation information associated with the record, wherein the request for animation information includes an application identifier associated with the application;
   identifying the record based at least in part on the application identifier;
   generating the animation information based upon the record, wherein the animation information comprises the condition and the frequency option; and
   sending the animation information to the client device, wherein the application executing on the client device causes the visual component to present the animation based on evaluation of the animation information.

2. The method of claim 1, further comprising:
   presenting, during the declarative programming wizard, a graphical user interface (GUI) comprising a first GUI widget for selecting the frequency option and a second GUI widget for selecting a path stage in a process,
   wherein the visual component is a path component visually representing a progress status of the process, and
   wherein the condition is associated with the path stage selected using the second GUI widget.

3. The method of claim 1, wherein the condition includes a user setting a data field.

4. The method of claim 1, wherein generating the application code associated with the application comprises: configuring the application to include an animation manager for dynamically rendering an animation component corresponding to the animation.

5. The method of claim 1, further comprising:
   configuring the visual component to determine an accessibility option of a browser on the client device executing the application,
   wherein the visual component presents the animation further based on the accessibility option.

6. A system comprising:
   a memory; and
   one or more processors and/or circuits coupled to the memory and configured to:
   receive, via a declarative programming wizard, a request to configure a visual component of an application to present an animation based on a a condition and a frequency option indicating how often the animation is to be presented when the condition is true;
   generate a record comprising the condition and the frequency option;

send application code associated with the application to a client device;

receive, from the client device in response to execution of the application code, a request for animation information associated with the record, wherein the request for animation information includes an application identifier associated with the application;

identify the record based at least in part on the application identifier;

generate the animation information based upon the record, wherein the application information comprises the condition and the frequency option; and send the animation information to the client device, wherein the application executing on the client device causes the visual component to present the animation based on evaluation of the animation information.

7. The system of claim 6, wherein the one or more processors and/or circuits are further configured to:

present, during the declarative programming wizard, a graphical user interface (GUI) comprising a first GUI widget for selecting the frequency option and a second GUI widget for selecting a path stage in a process, wherein the visual component is a path component visually representing a progress status of the process, and wherein the condition is associated with the path stage selected using the second GUI widget.

8. The system of claim 6, wherein the one or more processors and/or circuits are further configured to:

configure the application to determine an accessibility option of a browser on the client device executing the application, wherein the visual component presents the animation further based on the accessibility option.

9. The system of claim 6, wherein to generate application code associated with the application, the one or more processors and/or circuits are further configured to:

configure the application to include an animation manager for dynamically rendering an animation component corresponding to the animation.

10. A non-transitory computer-readable device having instructions stored thereon that, when executed by at least one computing device, cause the at least one computing device to perform operations comprising:

receiving application code including an animation manager and a visual component;

determining an application identifier based on the application code;

sending a request for animation information based on the application code, wherein the request includes the application identifier;

receiving the animation information from a service, the animation information identifying an animation associated with the visual component, a condition, and a frequency option indicating how often the animation is to be presented when the condition is true;

determining an evaluation result based on the animation information;

generating, by the animation manager, an animation component associated with the animation based on the evaluation result; and presenting the animation via the animation component.

11. The non-transitory computer-readable device of claim 10, wherein presenting the animation via the animation component comprises:

identifying browser settings associated with the browser executing the application; and determining that the browser settings do not request disabling of the animation.

12. The non-transitory computer-readable device of claim 10, wherein the visual component is a path component, and the operations further comprising:

presenting the path component, the path component indicating a progress status of a process;

receiving user input associated with a path step of the path component; and presenting the animation in response to the user input.

13. The non-transitory computer-readable device of claim 10, wherein determining the evaluation result based on the animation information comprises determining that a state of the application matches the condition of the animation information.

14. The non-transitory computer-readable device of claim 10, wherein generating, by the animation manager, the animation component associated with the animation based on the evaluation result comprises:

identifying configuration information corresponding to the animation component; and dynamically rendering the animation component based on the configuration information.

15. The method of claim 1, wherein the request to configure the visual component specifies a type of the animation, and wherein the animation information comprises the type of animation.

16. The method of claim 1, wherein the evaluation of the animation information comprises:

identifying a probability value associated with the frequency option; and determining whether to present the animation based on the probability value.

17. The system of claim 6, wherein the request to configure the visual component specifies a type of the animation, and wherein the animation information comprises the type of animation.

18. The system of claim 6, wherein the evaluation of the animation information comprises:

identifying a probability value associated with the frequency option; and determining whether to present the animation based on the probability value.

19. The non-transitory computer-readable device of claim 10, wherein determining the evaluation result comprises:

identifying a probability value associated with the frequency option; and determining whether to present the animation based on the probability value.

* * * * *